United States Patent [19]

Flaig

[11] Patent Number: 5,421,946
[45] Date of Patent: Jun. 6, 1995

[54] ELECTROMAGNETIC LABEL SENSOR HAVING SURFACE FOLLOWING MEMBER

[75] Inventor: Oswald Flaig, Ostfildern, Germany

[73] Assignee: Heinrich Hermann GmbH & Co., Stuttgart, Germany

[21] Appl. No.: 54,846

[22] Filed: Apr. 29, 1993

[51] Int. Cl.⁶ .................................... B65H 26/00
[52] U.S. Cl. .................. 156/361; 33/DIG. 1; 156/378; 221/73; 324/207.16
[58] Field of Search ............ 33/DIG. 1; 156/361, 156/363, 378; 324/207.16, 207.26, 226, 230; 221/73

[56] References Cited

U.S. PATENT DOCUMENTS

| | | | |
|---|---|---|---|
| 4,132,583 | 1/1979 | Hodgson | 156/361 |
| 4,400,665 | 8/1983 | Nix | 324/230 |
| 4,618,825 | 10/1986 | Fischer | 324/230 |
| 4,692,700 | 9/1987 | Nix | 324/229 |
| 4,695,797 | 9/1987 | Deutsch et al. | 324/230 |
| 4,700,486 | 10/1987 | Pumalainen | 33/147 L |
| 4,767,987 | 8/1988 | Montgomery | 324/231 |
| 4,817,430 | 4/1989 | Benes et al. | 73/579 |
| 4,821,565 | 4/1989 | Vossbeck et al. | 73/159 |
| 4,829,251 | 5/1989 | Fischer | 324/230 |
| 5,001,356 | 3/1991 | Ichikawa | 250/360 |
| 5,262,726 | 11/1993 | Kohmura et al. | 324/230 |

FOREIGN PATENT DOCUMENTS

| | | |
|---|---|---|
| 0096742 | 12/1983 | European Pat. Off. . |
| 0191899 | 9/1985 | European Pat. Off. . |
| 0274071 | 7/1988 | European Pat. Off. . |
| 0279173 | 8/1988 | European Pat. Off. . |
| 0299716 | 11/1991 | European Pat. Off. . |
| 2155885 | 5/1973 | France . |
| 1586360 | 10/1970 | Germany . |
| 7243915 | 7/1973 | Germany . |
| 2537853 | 3/1977 | Germany ........................ 156/361 |
| 2828103 | 1/1980 | Germany ........................ 156/361 |
| 3505387 | 8/1986 | Germany . |
| 8702522 | 5/1987 | Germany . |
| 3617689A1 | 12/1987 | Germany ........................ 156/361 |
| 3618542 | 12/1987 | Germany . |
| 8806230 | 9/1988 | Germany . |
| 3404720 | 10/1988 | Germany . |
| 3401466 | 2/1989 | Germany . |
| 3723933 | 2/1989 | Germany . |
| 3929469A1 | 4/1990 | Germany ........................ 156/361 |
| 3331407 | 2/1991 | Germany . |
| 3437253 | 5/1991 | Germany . |
| 661704 | 11/1951 | United Kingdom . |
| 2025906 | 1/1980 | United Kingdom . |

*Primary Examiner*—Joseph W. Drodge
*Attorney, Agent, or Firm*—Frishauf, Holtz, Goodman & Woodward

[57] ABSTRACT

A label sensor (45) serves to sense or scan a backing strip (14) that is provided with labels (17) thereon, and serves to control a labeling process in a labeling machine. The label sensor has a spring element (80) coupled to a ferromagnetic core (87) provided with a winding (85) thereon. The spring element (80) also is coupled to a surface following member (94) arranged to contact the side of the backing strip (14) carrying the labels (17). In operation, the winding (85) is excited with radio-frequency signal, and the voltage at the winding (85) is evaluated by an electrical evaluation circuit (103). This voltage is a function of whether the surface follower (94) is located on a label (17) or in a gap (20) between two labels, and it may serve to control a labeling machine.

31 Claims, 11 Drawing Sheets

ELECTROMAGNETIC LABEL SENSOR HAVING SURFACE FOLLOWING MEMBER

FIELD OF THE INVENTION

The invention relates to a label sensor for scanning a backing strip provided with labels thereon. One such label sensor is known from German Patent Disclosure 38 18 542 A1.

BACKGROUND OF THE INVENTION

In most labeling machines, label feeding is controlled by a label sensor. The individual labels, which are usually pressure-sensitive, are located at short intervals from one another, typically one to two millimeters, on a backing strip from which they are peeled off in the labeling process and transferred to the article to be labeled, such as a bottle. The application of a label onto the article to be labeled must be done with high precision, which is known as positioning accuracy. Close tolerances that are typically less than 1 mm are involved. To achieve this, it is necessary to detect the location of the label on the backing strip accurately by means of a label sensor. This is usually done by detecting the location of the edge of the label with the label sensor.

In labels that are not transparent, light gates are used to detect the location of the label edge. This technique is not possible, however, with transparent labels, nor when the backing strip is either not transparent or is not homogeneous. In such cases, a reflective marking is made on the label, and this reflective marking is then scanned by a beam of light. Such reflective markings are not popular with label designers, however. Also, the positioning accuracy is decisively dependent on how accurately the reflective marking is printed on the label. That is, inaccuracies in printing increase the tolerances, and the positioning accuracy declines. This is equally true if such reflective markings are given too little ink because of errors in printing; in other words if the degree of color saturation is not high enough. Such errors in printing can cause a sharp decline in the positioning accuracy.

For these reasons, with transparent labels, mechanical switches are used that are controlled by a scanner or stylus for the label surface and that scan and detect the label edge. However, since transparent film labels have a thickness of only about 0.04 mm, it is very difficult and time-consuming to set such mechanical switches correctly. Temperature fluctuations or jarring of the machine can shift the switching point, and 30 minutes or more can easily elapse until the machine is then readjusted, with a corresponding loss of production. Moreover, with such mechanical switches the scanner can make scratches on the labels.

SUMMARY OF THE INVENTION

It is accordingly an object of the invention to provide a novel label sensor overcoming the above-described drawbacks of the prior art.

According to the present invention, a label sensor is provided for scanning a label strip and for controlling a labeling process wherein the label strip includes a backing strip provided with labels removably adhered on a surface of said backing strip, and the label strip is movable on an electrically conductive support surface relative to the label sensor. The label sensor comprises a spring element; a ferromagnetic core provided with a winding, said core being coupled to said spring element and being biased by said spring element toward said support surface; a surface following member hereinafter sometimes referred to as "scanner," coupled to said spring element, said spring element being adapted to bias said surface following member toward said support surface and toward the surface of said label strip having the labels thereon, such that said surface following member contacts said relatively moving label strip; means for electrically exciting said winding with a high frequency signal to produce a magnetic field by said winding; and evaluation circuit means coupled to said winding for receiving a voltage output of said winding and for producing a signal indicating the presence or absence of a label at said label sensor.

The label sensor is also particularly suitable for processing transparent labels.

In the installed state on a labeling machine, the labels rest against a support surface, for instance what is known as a peeler blade. The support surface or stop face is electrically conductive and it cooperates with the label sensor winding and with the radio-frequency magnetic field generated by this winding and permits a very precise detection of the distance of the scanner from the support surface. Substantial adjustment work on a label sensor according to the invention is unnecessary, and any read-justments can be done very simply and with minimal expenditure of time by adjusting the electrical circuit, for instance by adjusting an electrical adjustment member. The scanning is also largely independent of the speed of the label strip—because such a scanner may have a low mass—and is therefore also suitable for label strips moving at a high speed, of the kind that are used increasingly today. Since the actual sensor system only needs to have a low mass, it can scan or sense the label strip with only small contact pressures. This avoids scratches on the labels, and the wear on the scanner contact surface becomes very slight. Despite the high sensitivity that can be attained with such a sensor, it is nevertheless insensitive to jarring, of the kind that is unavoidable in such machines.

Further details and advantageous features of the invention will become apparent from the exemplary embodiments described in detail below in conjunction with the drawing, which however should be understood to represent no restriction whatever of the invention.

DETAILED DESCRIPTION

Figures 1, 1A:
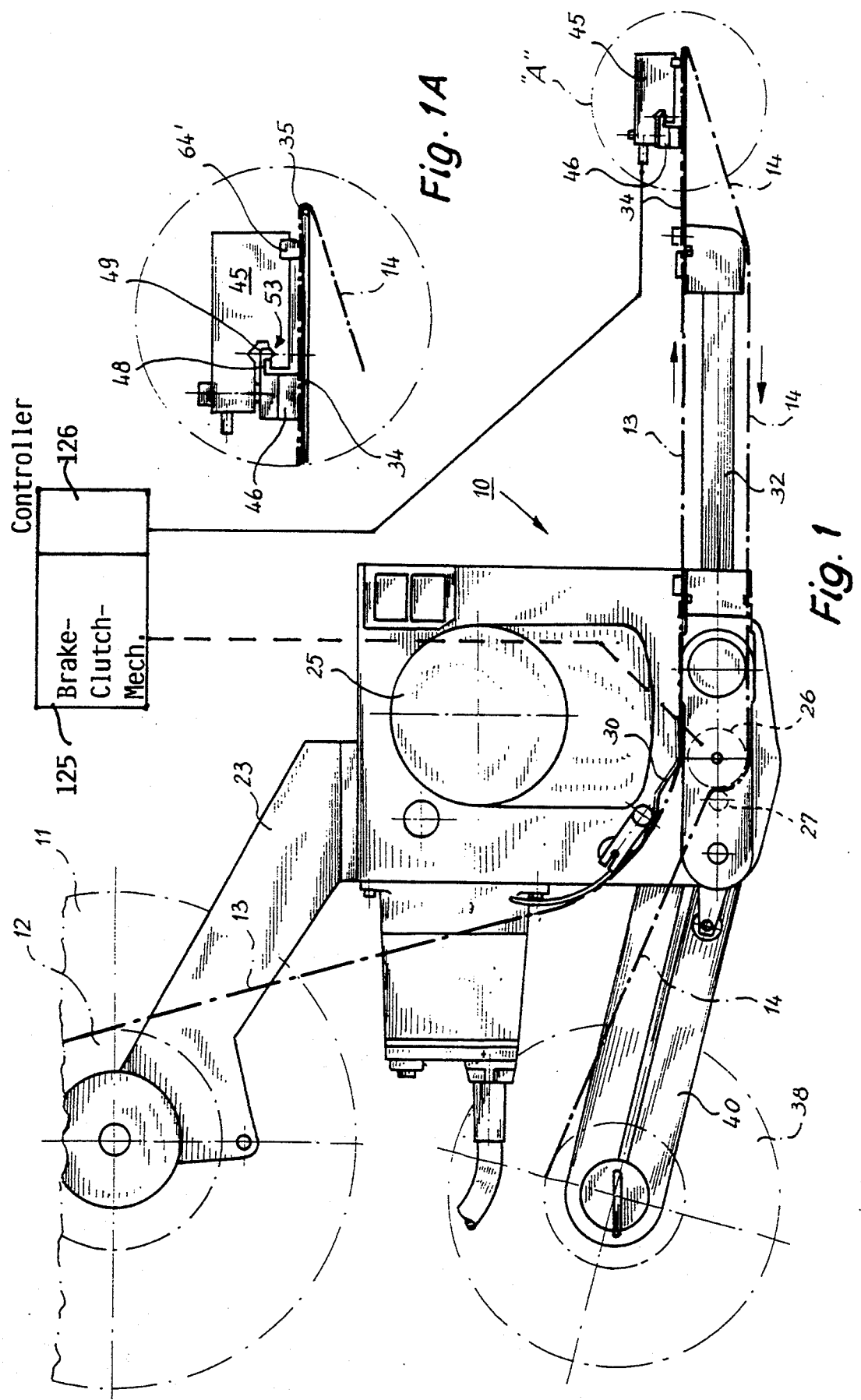
FIG. 1 is a schematic plan view of a first exemplary embodiment of a labeling machine incorporating a label sensor according to the invention.
FIG. 1A is an enlarged view of detail A of FIG.1.

FIG. 1 shows a schematic plan view of a preferred exemplary embodiment of a labeling machine 10, which includes a roll holder for a supply roll 12 of label strip 13, which is represented in FIG. 1 by a dot-dashed line.

Figure 7:
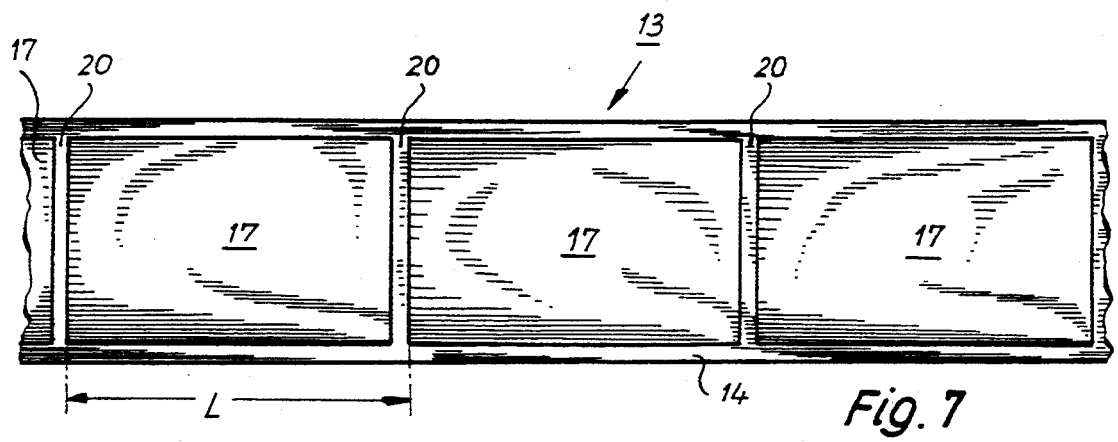
FIG. 7 is a plan view, seen from the label side, of a backing strip provided with pressure-sensitive labels, hereinafter called a label strip or a combination backing strip and peel-off labels.
Figure 8:
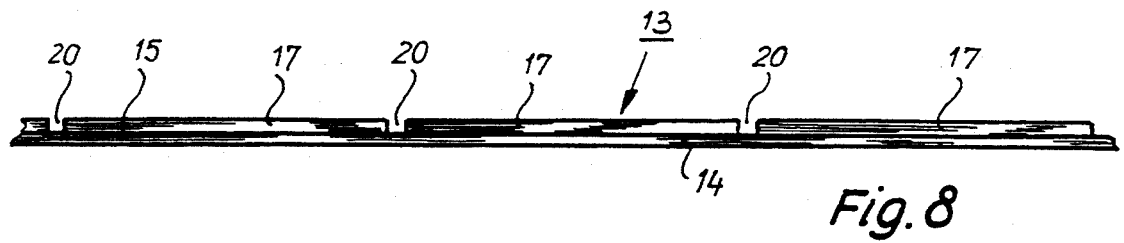
FIG. 8 is a side view of the label strip of FIG. 7, with the thickness shown greatly exaggerated, since the total thickness of such a label strip is usually between about 0.1 and about 0.2 mm.

FIGS. 7 and 8 show the basic structure of a label strip 13 of the kind shown in FIG. 1. Label strip 13 comprises a backing strip 14, which usually is made from a transparent special paper, which is provided on its side that is uppermost in FIG. 8 with a release coating, for example a silicon film 15. Typically, the backing strip 14 has a thickness of approximately 0.06 mm, with slight fluctuations in thickness of approximately 1.3%.

Located on the silicon film 15 are pressure-sensitive labels 17, which are provided on their underside with a glue (adhesive) film approximately 0.03 mm thick. The labels 17 typically have a thickness in the range from about 0.04 to about 0.1 mm. Labels of transparent material, which are also known as film labels, have a thickness of only about 0.04 mm and therefore represent an especially difficult problem for a label sensor.

It will be appreciated that the scale of the thickness in FIG. 8 is greatly exaggerated, because a thickness of about 0.13 mm would be impossible to show in a drawing. However, the reader should attempt to keep these conditions in terms of thickness in mind in order to understand the present invention and the problem it addresses.

Gaps 20 having a width of usually about 1 to about 2 mm are provided between the labels 17 and result from the fact that corresponding parts have been stamped out between the labels 17. These stamped-out parts are called webs. In production, such a web sometimes remains between two labels, and this makes it impossible for the label sensor to recognize the applicable label. Along with the webs, parts around the labels 17 are also stamped out and removed.

A label strip 13 of this kind is also known as a combination backing strip and peel-off labels, since the pressure-sensitive labels 17 stick to the backing strip 14. However, the labels 17 can be peeled off the backing strip 14 by known techniques and transferred to an article (not shown) which is intended to be labeled.

Since the labels 17 are created by repeated stamping operations, their spacing on the backing strip 14 can fluctuate somewhat. This spacing L (FIG. 7) is called the label spacing, and as noted it is not entirely constant.

Referring back to FIG. 1, the roll holder 11 is mounted to the drive unit 25 of the labeling machine 10 via a support arm 23. The drive unit 25 comprises an electric motor that rotates continuously during operation, and a brake-clutch combination (schematically shown by box 125), for the intermediate drive of a positioning roller 26 against which a contact or pressure roller 27 rests. A belt-type or leaf-type brake 30 is located on the drive unit 25 and serves to brake the label strip 13 and thereby keep it taut. A peeler blade 34 in the form of a straight metal sheet is also secured to the drive unit 25, via a support arm 32, and at this peeler blade 34, which is shown enlarged in FIG. 1A, the label strip 13 is deflected by an angle of approximately 340°, causing the label 17 to be peeled off on its right end 35 (FIG. 1A) and to be transferred from there to a suction device (not shown) or the like, for example.

The support arm 32 supports many additional devices, such as a printer for imprinting the labels 17, or a reader for encoded labels 17. In many cases, the additional devices are not secured to the drive unit 25 itself but rather to a suitable mounting member or the like.

At the right-hand end 35 of the peeler blade 34, after deflection of the label strip 13, only the backing strip 14 is then present. The backing strip 14 is returned toward the left, below the peeler blade 34. It is passed between the positioning roller 26 and the contact or pressure roller 27 and from there is passed to a backing strip winder 38, which is mounted to the drive unit 25 via a support arm 40. Naturally, the support arms 23 and 40 may also be secured at other points than to the drive unit 25.

To control the drive of the positioning roller 26 (via the aforementioned motor and brake-clutch combination 125), a label sensor 45 is used, which is located on the right-hand end of the peeler blade 34 (FIGS. 1 and 1A) and cooperates with the peeler blade 34. It should be pointed out that in the illustrated embodiment, the label sensor 45 is located on a stationary peeler blade 34, but it could equally well be located on a movable dispenser blade, of the kind shown for instance by the aforementioned German Patent Disclosure 36 18 542 A1.

For securing the label sensor 45, a mount or bracket 46 (FIG. 1A) is secured to the top of the peeler blade 34. Mount 46 has a protrusion 48 pointing to the right, with a trunnion or pointed end portion 49 pointing downward, as clearly shown in FIG. 1A. The trunnion or pointed end portion 49 engages a corresponding prismatic recess 52 (FIG. 2) of a support part 54 of the label sensor 45. The pointed end portion 49 and the recess 52 form a ball and socket-type joint 53.

Two vertically extending identical tubes 56, 56' (FIG. 3.), are secured in the left-hand portion of the support or body part 54. Each tube 56, 56' contains a spring 58 (FIG. 2), which is supported at the upper end of the applicable tube and which at its lower end rests against a ball 60, which in turn rests against a constriction 62 at the lower end of the tube 56 or 56'. In other words, the ball 60 and spring 58 are captive in their respective tubes 56, 56'.

After assembly, the two balls 60 are biased rest with prestressing against corresponding indentations (forming a detent) in the top of the mount member 46 and as a result bring about a torque that acts clockwise around the joint 53 that is formed by the trunnion or pointed end portion 49 and the prismatic recess 52 and whose axis of rotation extends parallel to the plane of the label strip 13 (in the region of the peeler blade 34), or in other words horizontally as seen in FIGS. 1 and 1A.

Figure 2:
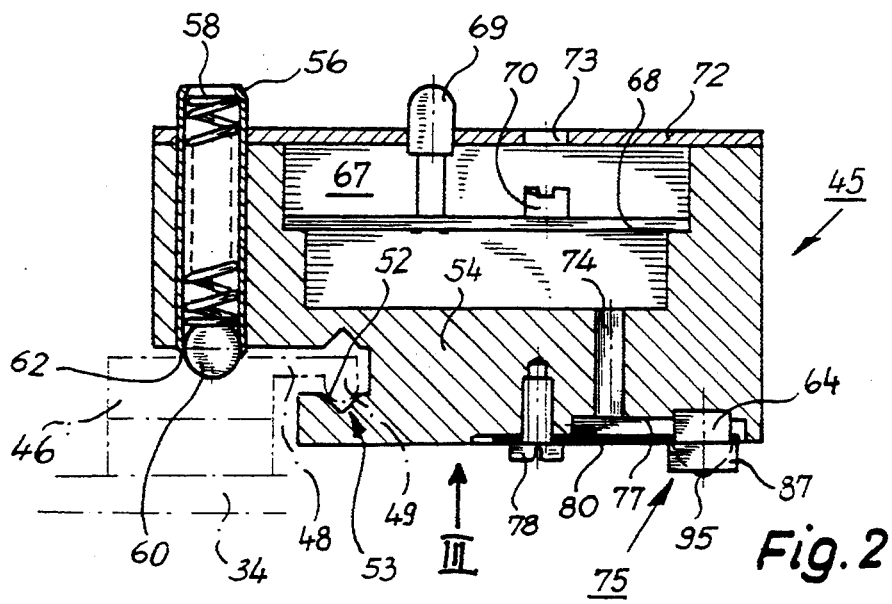
FIG. 2 is a section, taken along the line II—II of FIG. 3, through a preferred embodiment of the label sensor according to the invention used in FIG. 1.
Figure 3:
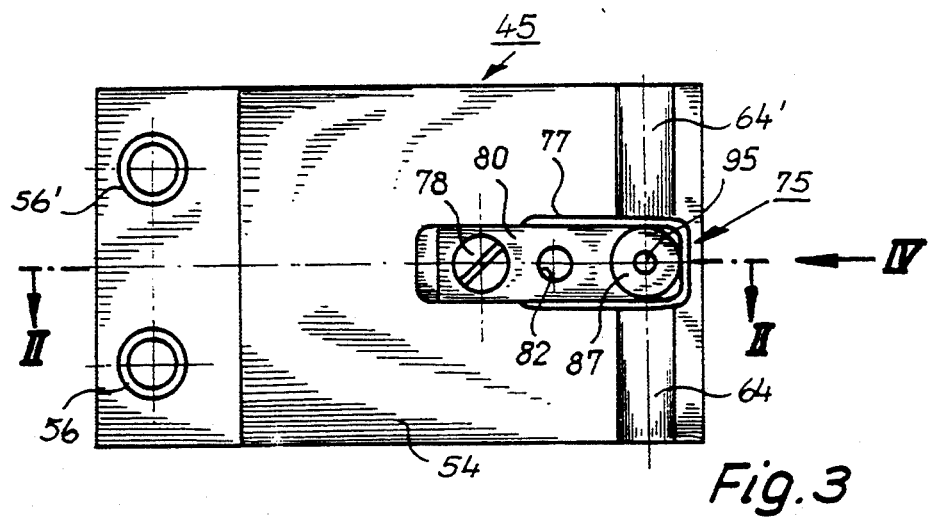
FIG. 3 is a plan view of the label sensor of FIG. 2, seen in the direction of the arrow III in FIG. 2.

Two holding-down devices 64, 64' (FIG. 3) are secured to the underside of the support or body part 54, on the right side as seen in FIGS. 2 and 3. On the side facing toward the label strip 13, hold-down devices 64, 64' are rounded and accordingly rest with this rounded profile on the label strip 13 and there press the label strip against the upper surface of the peeler blade 34, which here acts as a bearing face. This has proven to be advantageous for the mode of operation of the present invention. The pressing force is effected by the torque that is generated by the springs 58. The two holding-down devices 64, 64' extend transversely to the direction of motion of the label strip 13. They are manufactured from a wear-resistant material preferably for example, oxide ceramic, or other suitable materials, to prevent rapid wear. Holding-down devices 64, 64' are preferably installed in a replaceable manner on the support or body part 54, and their task is to keep the label strip 13 pressed constantly against its support surface, so that false results will not be obtained upon measurement by the label sensor 45.

Figure 4:
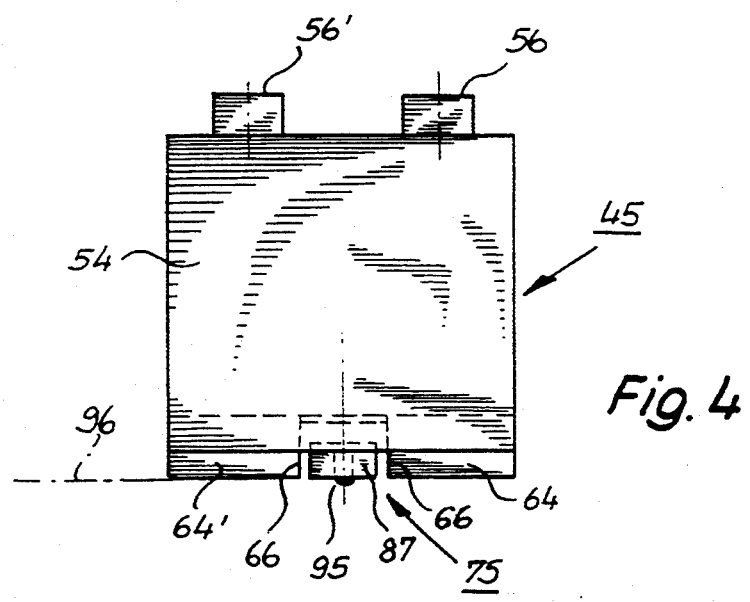
FIG. 4 is a side view, seen in the direction of the arrow IV in FIG. 3.

As shown in FIGS. 3 and 4, the two holding-down devices 64, 64' do not extend over the entire width of the label sensor 45 (FIGS. 2–4 show the label sensor 45 on an enlarged scale namely with approximately twice the enlargement). Instead, a distance or space 66 (FIG. 4) remains open between them, and it is there that the actual sensor system that will be described below is located.

Figure 5:
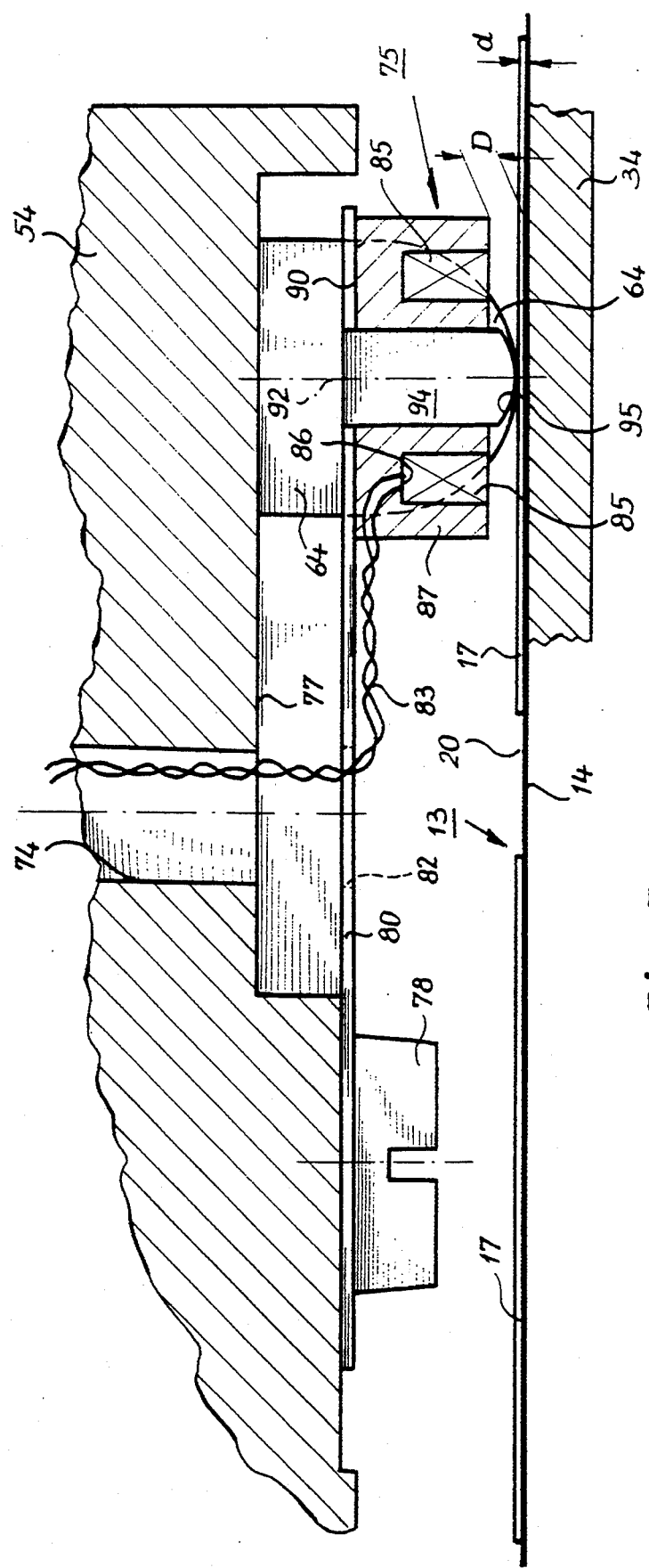
FIG. 5 is a greatly enlarged view of the actual sensor system of FIGS. 1-4.

The support or body part 54 has a recess 67 (FIG. 2) on the top portion thereof. A circuit board 68 with a printed circuit thereon is received in the recess 67. A light-emitting diode (LED) 69 and an adjusting potentiometer 70 are mounted on the circuit board 68, along with other electronic components, not shown, of an evaluation circuit (to be described later with reference to FIGS. 6 and 14). The recess 67 is closed off on the top by a cover plate 72, in which there is a hole 73 through which the potentiometer 70 can be adjusted. The LED 69 also extends through a hole in cover plate 72. A bore 74 also extends downward from the recess 67 to an elongated lower recess 77, in which the actual sensor system 75 is located, which is shown in FIG. 5 on a greatly enlarged scale to make for easier comprehension. It should be noted that the sensor system 75 shown does not in fact become the sensor system until it cooperates with an electrically conductive element of the labeling machine 10 located opposite it, such as the peeler blade 34 of sheet metal in FIG. 1, or some other electrically conductive element, in or on a supporting surface.

As shown in FIGS. 2, 3 and 5, a leaf spring 80 is secured to the underside of the support or body part 54 by means of a screw 78. The leaf spring 80 is typically made from sheet steel and may have dimensions of about $5 \times 17 \times 0.3$ mm, for example. From its fastening point at screw 78, the leaf spring 80 projects in the direction of motion of the label strip 13 and approximately parallel to it, or in other words to the right in FIGS. 1 and 5. Approximately in its middle, the leaf spring 80 has a hole 82, which is aligned with the bore 74. The bore 74 together with the hole 82 serve as a duct for electrical connection lines 83 (FIG. 5), which are connected to the printed circuit 68 or printed circuit board (FIG. 2).

The connection lines 83 lead to a winding 85, which is located in an annular recess 86 of a half-shell core 87 of ferrite, or in other words of ferromagnetic material. This half shell core 87 typically has an outside diameter of about 5 mm, and the winding 85 may for instance have about 100 turns. The half-shell core 87 is a typical RF (radio-frequency) technology core, since the winding 85 is supplied via the connection line 83 with a radio-frequency AC voltage having a frequency that is typically between about 0.3 and about 1 MHz during operation.

The half-shell core or half-shell ferrite member 87 is secured by its closed top 90, in the manner shown, to the underside of the free end of the leaf spring 80, for instance by adhesive bonding.

Once the winding 85 is excited by a high frequency signal, it outputs a corresponding high-frequency magnetic field on its underside, and in the opposed electrically conductive element (metal peeler blade) 34, this magnetic field generates eddy currents. The shorter the distance D (FIG. 5) between the underside of the magnet core 87 and the electrically conductive element 34, the more eddy currents are generated.

A mechanical scanner or surface following member 94 is located in a recess in the region of the center axis 92 of the magnet core 87 and rests at its free end 95, which is preferably made of hard ceramic, ruby, diamond, or the like, against the label strip 13 in the manner shown in FIG. 5, with mechanical bias. The mechanical scanner 94 is preferably glued or otherwise adhered into a suitable bore of the half-shell ferrite core member 87.

The leaf spring 80 is formed in such a way and mounted on the support or body part 54 such that the free end 95 of the scanner 94, in the unloaded state, protrudes beyond the plane 96 (FIG. 4) in which the lower ends of the holding-down devices 64, 64' are located. See FIG. 4. As should be clearly apparent, the scanner 94 could also be located close to (adjacent to) the face of the magnet core 87, but the arrangement shown in FIG. 5 is preferred.

Figure 6:
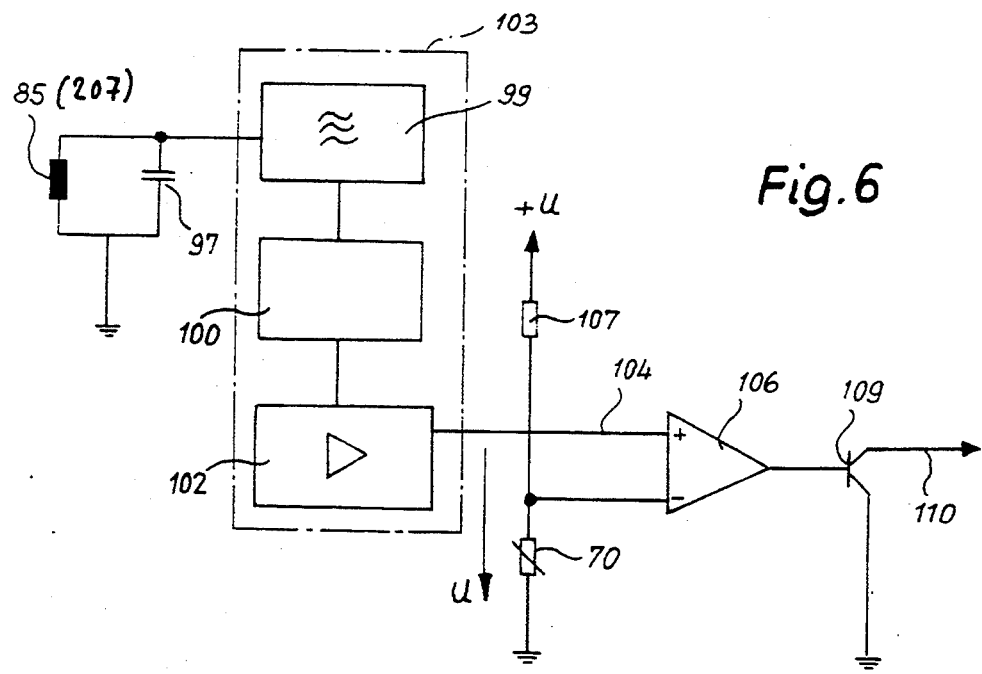
FIG. 6 is a schematic view of an electrical evaluation circuit used in the present invention.

As shown in FIG. 6, the evaluation circuit comprises a capacitor 97 connected in parallel to the winding 85. Together with the inductance of the winding 85, a capacitor 97 forms part of a resonance circuit for the desired operating frequency, which as noted is typically between about 0.3 and about 1 MHz. To that end, an oscillator 99 is provided, to which a demodulator 100 and an amplifier 102 for the demodulated voltage are connected. Elements 99, 100 and 102 are well known and obtainable in the form of an integrated circuit 103 available on the market, such as the Siemens TCA505 chip.

The output voltage U of the amplifier 102 is coupled to the positive input of a voltage comparator 106 via a line 104. The negative input of voltage comparator 106 is connected to a voltage divider comprising a fixed resistor 107, which is connected to a voltage of $+U$, and the potentiometer (variable resistance) 70 (FIG. 2), one end of which is connected to ground. Connected to the output of the comparator 106 is a switching transistor 109, whose output is connected to the controller portion 126 of the aforementioned brake-clutch combination 125 of the main drive part 25 of the labeling machine 10.

With the aid of the potentiometer 70, the machine operator can adjust a reference value for thickness that is greater than the thickness of the backing strip 14 but less than the combined thickness of the backing strip 14 and label 17. The output voltage of the comparator 106 therefore changes its sign (polarity) if the scanner 94 passes from a label 17 into a gap 20 between two labels 17 and as a result varies its position relative to the electrically conductive element (peeler blade) 34.

If the label sensor 45 detects a gap 20 between two labels 17, or in other words if the frontmost label has already for the most part been peeled off the backing strip 14, then the label sensor 45 sends a signal accordingly to the controller 126 of the brake-clutch combination 125. After a predetermined follow-up time, this brake-clutch combination 125 then stops the positioning roller 26. At that moment, at which the positioning roller 26 is at a standstill, the scanner 95 is already located at the next label 17, so that one is aware that a label for the next labeling process is present. This is monitored accordingly by the controller 126. The label 17 that has been released at the front end 35 of the peeler blade 34 is either transferred directly to an article to be labeled, or by way of example it is taken over by a suction device (not shown) and then transferred to the article to be labeled. Once the labeling process is ended, the positioning roller 26 is driven again, and the process described is repeated.

The mode of operation of the invention is based on the fact that the amplitude of the output of the oscillator is damped all the more markedly, the closer the half-shell ferrite core 87 approaches the electrically conductive element 34, or in other words the shorter the distance D (FIG. 5) becomes.

Figure 9:
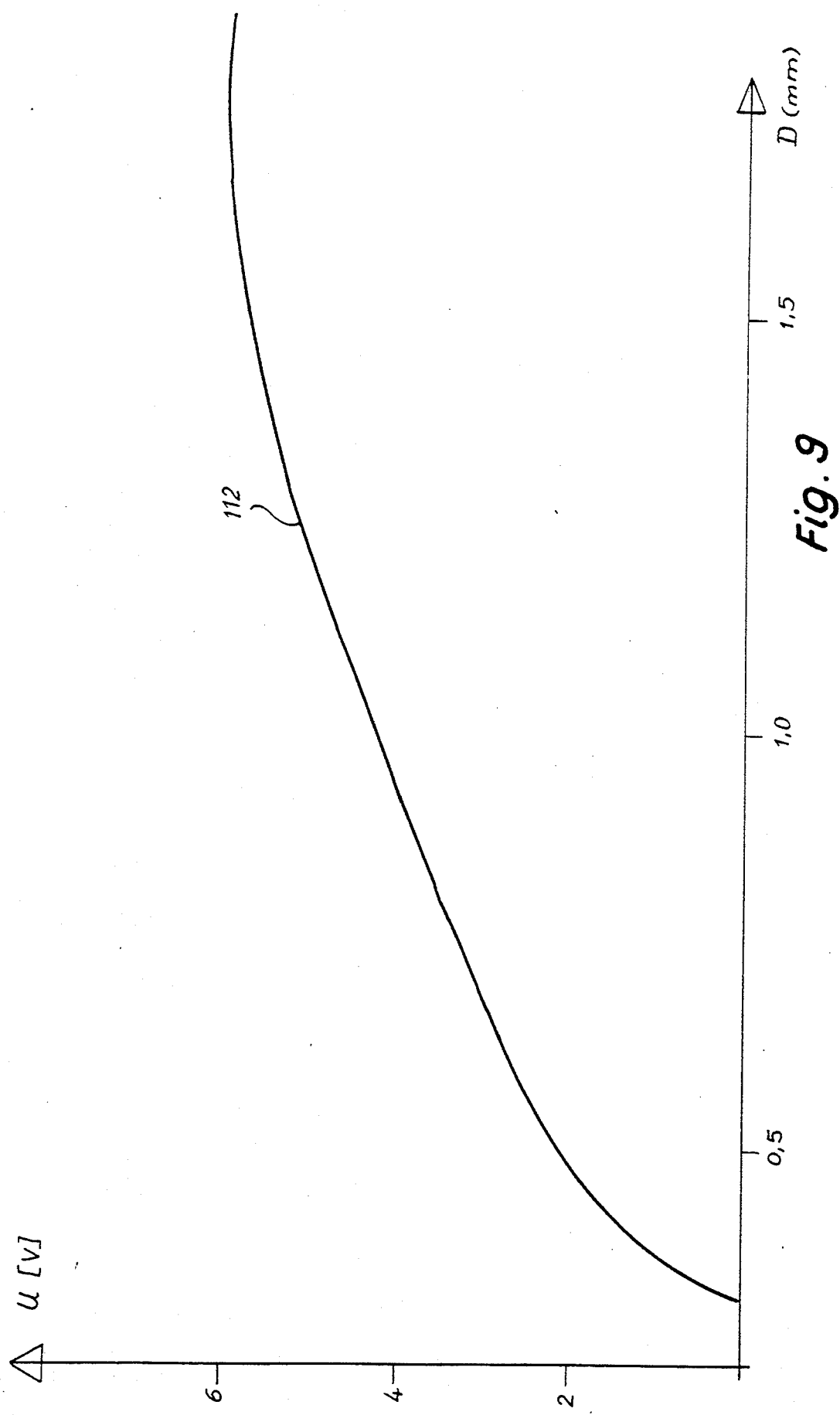
FIG. 9 illustrates the relationship between the measured distance D (between the ferrite core of the sensor and a support surface) and the output voltage.

FIG. 9 shows this relationship with an exemplary measurement curve 112. For a distance D of less than 0.2 mm, the oscillator oscillations are blocked completely; that is, no output signal U is obtained. Beyond a distance D of approximately 0.2 mm, the oscillator 99 begins to oscillate, and as the distance increases, its amplitude and hence the output voltage U of the amplifier 102 increase in the manner shown. It can also be seen that a fairly linear region is obtained for values of D between about 0.6 and about 1.4 mm. A suitable operating point in this substantially linear region can be obtained by means of a suitable selection of the length of the scanner 94, 95. The actual working stroke at the selected point on the measurement curve 112 amounts to only approximately 0.07 mm—for a film label— and corresponding to that is only a correspondingly low voltage rise, but the voltage rise can be further amplified by means of the voltage comparator 106 which serves as an amplifier for the voltage change, so that an adequate voltage rise for driving the switching transistor 109 is obtained.

Figure 10A:
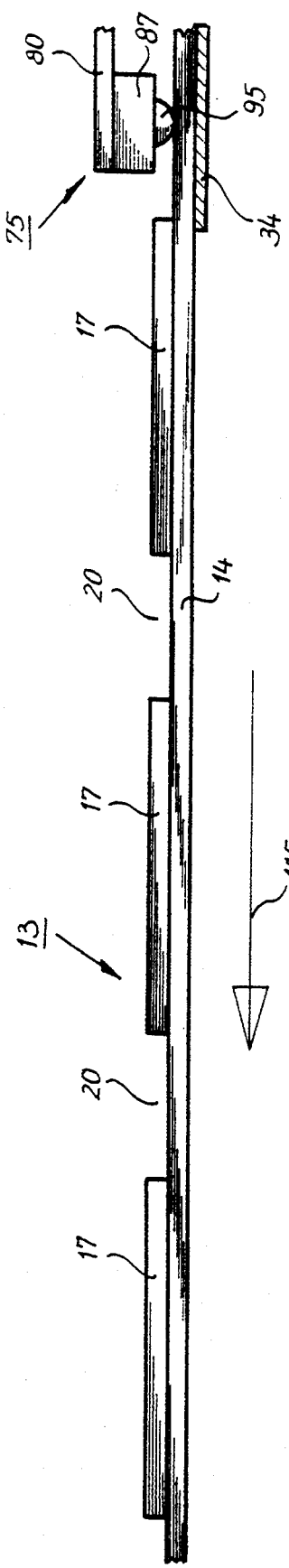
FIG. 10A is a schematic view showing the scanning of a label strip.
Figure 10B:
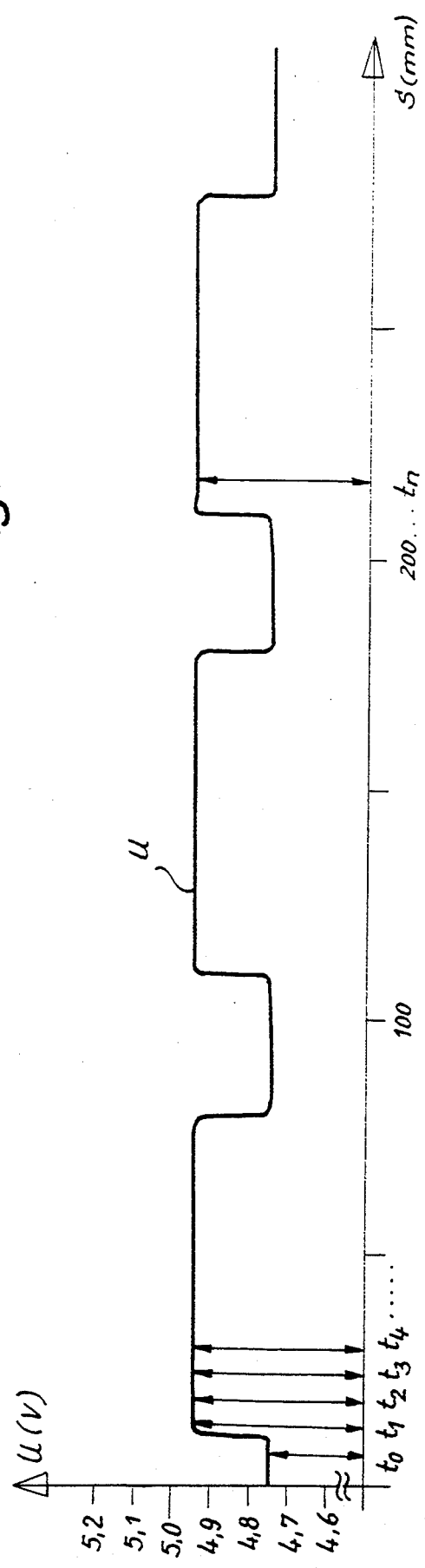
FIG. 10B shows the associate output voltage of the label sensor, when sensing the label strip of FIG. 10A.

FIGS. 10A and 10B show the measurement visually in terms of an example. FIG. 10A shows a label strip 13, which is moving to the left in the direction of an arrow 115, in the course of which label strip 13 passes beneath a sensor 75, of the kind shown in FIGS. 1–4.

FIG. 10B shows the output voltage U at the output line 104 of FIG. 6. It can be seen that this voltage represents an electrical copy of the label strip 13, in a manner somewhat comparable to a sonar image of a sea bottom. With this kind of voltage, accurate control processes are possible even at high label speeds, such as about 1 m/s, as experiments performed by the present inventor have shown.

Figure 11A:
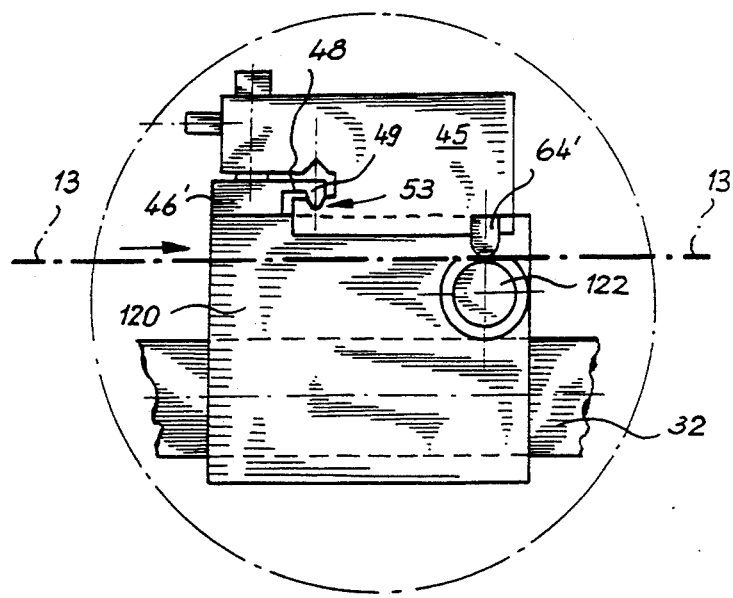
FIG. 11A is an enlarged view of detail B of FIG. 11.
Figure 11:
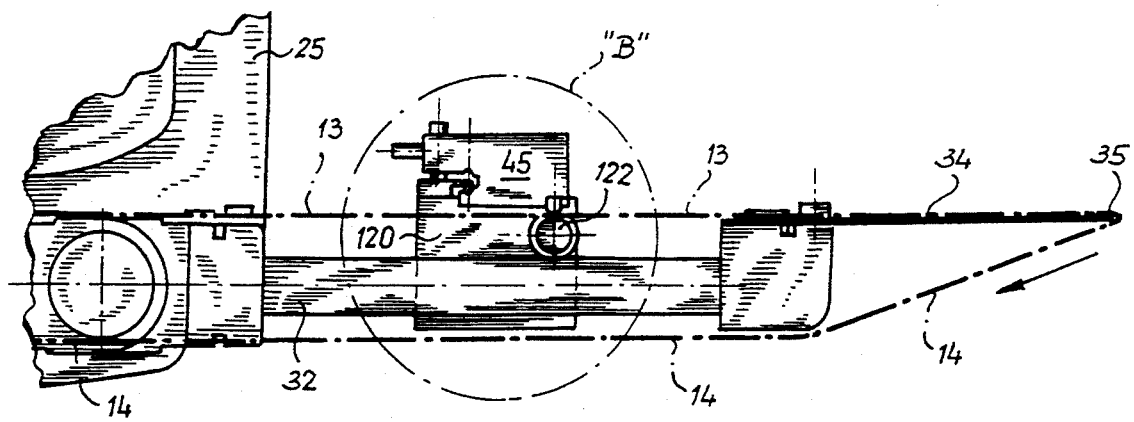
FIG. 11 is a variant of the embodiment of FIG. 1 in which the label sensor is located at a great distance from the peeler blade.

FIGS. 11 and 11A show a variant of the embodiment of FIGS. 1 and 1A. The difference is that in FIGS. 11 and 11A, the label sensor 45, which matches that of FIGS. 1–4, is located on the arm 32 instead of on the peeler blade 34. Otherwise, the labeling machine is identical to that of FIG. 1, and it is therefore shown in only a fragmentary fashion. Elements that are the same or function the same as in the previous drawing figures will by convention be identified by the same reference numerals and not described again.

As shown in FIGS. 11 and 11A, a support member 120 is secured to the arm 32, and a mount 46 whose shape is exactly equivalent to the mount 46 of FIGS. 1 and 1A, and which will therefore not be described again here, is secured to its top. Also located on the support member 120 is a support surface 122, which faces the scanner 94, 95 and the holding-down devices 64 and 64' and which is made of an electrically conductive material. Stop face 122 cooperates with the sensor 45, which is not visible in FIGS. 11 and 11A.

By comparison with FIGS. 1 and 1A, the arrangement of FIGS. 11 and 11A is not so advantageous, because here fluctuations in the label spacing L (FIG. 7) make themselves more strongly felt, since the distance between the label sensor 45 and the right-hand end 35 of the peeler blade 34 is greater than in FIG. 1, and so fluctuations in the label spacing L result in greater tolerances in the labeling process. Nevertheless, for reasons of space, one may be forced to make use of the version shown in FIGS. 11 and 11A.

Figure 12:
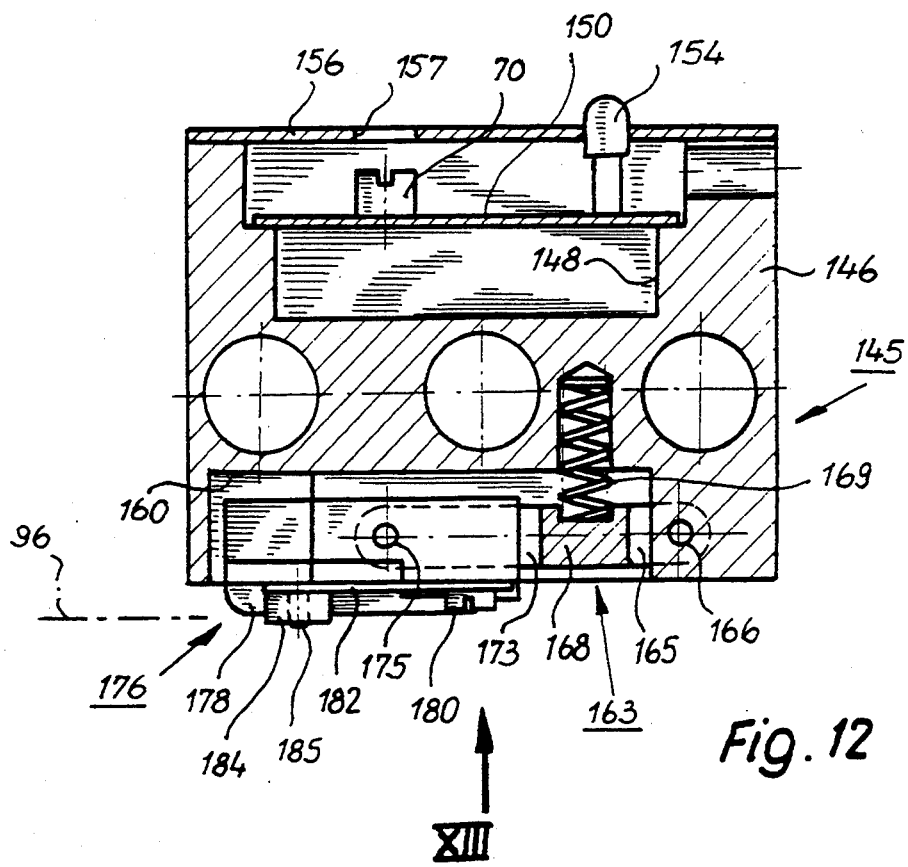
FIG. 12 is a section, taken along the line XII—XII in FIG. 13.
Figure 13:
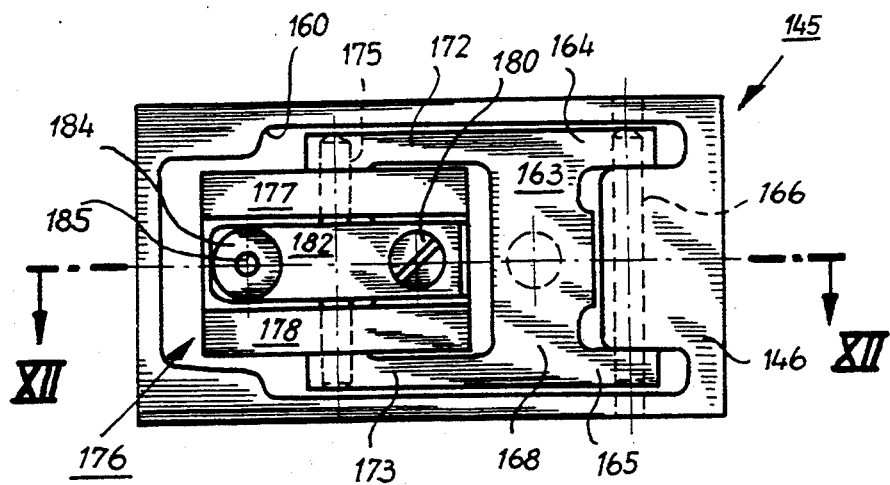
FIG. 13 is a plan view of the label sensor of FIG. 12, viewed in the direction of the arrow XIII in FIG. 12.

FIGS. 12 and 13 show a variant of the label sensor 45 of FIGS. 1–4. The label sensor 145 of FIGS. 12 and 13 is rigidly mounted on the labeling machine 10, for instance by being screwed firmly to one part of the labeling machine. Hence, how it is mounted is not shown. It may for instance also be mounted above the peeler blade 34, similarly to FIG. 1, and for its function, a support surface (for the label strip 13) with an electrically conductive element, is required, as already described in detail.

The label sensor 145 has a support member 146, which in its upper surface, has a recess 148 in which a circuit board 150 with a printed circuit thereon is secured, of which only the potentiometer 70 and an LED 154 are shown. The recess 148 is closed off at the top by a coverplate 156, in which a hole 157 is provided for access to the potentiometer 70. Like the LED 69 of FIG. 2, the LED 154 serves to indicate the switching state, or in other words indicates whether the scanner is located at a label 17 or in a gap 20 between two labels.

An elongated recess 160 is located at the underside of the support member 146, and a rocker member 163, which in a plan view from below (FIG. 13) is approximately in the form of an H, is pivotally secured to the right-hand end of recess 160 by means of a pivot shaft 166. Both the right-hand end portions 164, 165 of the rocker are pivotably connected to the support part 146 via the pivot shaft 166 and can therefore rotate about an axis of rotation defined by the pivot shaft 166. A compression spring 169 projects from above against the middle rib portion 168 of the H-shaped rocker 163. The top of spring 169 is supported in a bore of the support member part 146 in the manner shown in FIG. 12. The two left-hand end portions 172, 173 of the H-shaped rocker 163 rotatably support—by means of a horizontal shaft 175—a holding-down shoe 176, which is provided on the bottom on both longitudinally extending sides thereof with a runner-like holding-down device 177 and 178, respectively, so that the holding-down shoe 176 is in principle embodied like a sled and in operation slides with both runners 177, 178 on the label strip 13 and presses it against the associated support surface.

A spring steel sheet-like member 182 is secured by a screw 180 between the runners 177 and 178, and on its left-hand free end it carries a half-shell ferrite core 185 with a winding (not shown in detail) and a scanner 185. The spring steel sheet 182 is movable freely upward on its free end located on the left as seen in FIG. 12, and is therefore capable of tracing the irregularities of a label strip 13.

The magnet core 184 is adhesively bonded to the free end of the spring steel sheet 182. Including its scanner 185 and its winding, it is identical to what is shown on an enlarged scale in FIG. 5 and described in detail there for the magnet core 87 and the scanner 94.

In operation, the runners 177, 178 slide over the moving label strip 13, and the scanner 185 rests with mechanical bias against the label strip 13, since in its rest position (see FIG. 12) the scanner 185 protrudes beyond the plane 96 that is defined by the underside of the runners 177, 178. The scanner 184 therefore follows all of the irregularities on the surface of the relatively moving label strip 13. The evaluation circuit matches that of FIG. 6, so that the measurement curve 112 of FIG. 9 once again applies.

Experiments have shown that at present the first exemplary embodiment with the label sensor 45 as shown in FIGS. 1–4 is preferred, but the label sensor 145 of FIGS. 12 and 13 also gives good results. Since in both cases the mode of operation is the same, reference is made to the explanation of the first exemplary embodiment, that is, the label sensor 45. The direction of motion of the label strip 13 must be imagined as from right to left in FIGS. 12 and 13.

Figure 14:
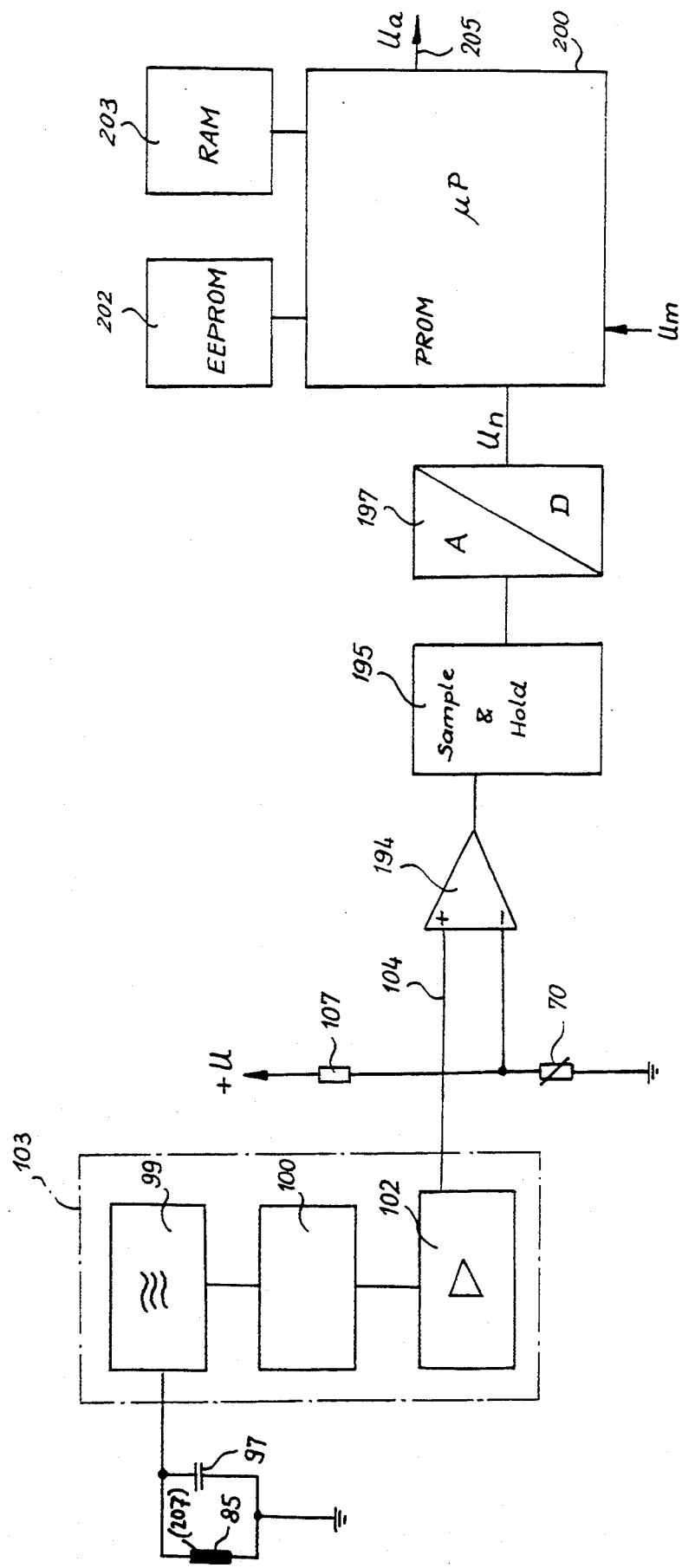
FIG. 14 is a variant of the evaluation circuit shown in FIG. 6.

FIG. 14 shows a variant of the evaluation circuit shown in FIG. 6. The circuit of FIG. 14 is preferably on the printed circuit board 68, 150 in the recess 67, 148 in the upper part of the support or body member 54, 146. The evaluation circuit of FIG. 14 adaptively matches changes in thickness of the backing strip 14 and changes in measurement values resulting from heating or cooling; it also permits automatic measurement of a new label strip 13. Elements that are the same or function the same as in FIG. 6 are identified by the same reference numerals, and by convention will not be described again. In particular, the left-hand part of the circuit of FIG. 14 matches the corresponding part of FIG. 6, as can easily be seen.

A sample and hold memory circuit 195 is connected to the output of a differential amplifier 194, whose terminals correspond to those of the comparator 106 of FIG. 6. Under the control of a timer included in the sample and hold memory circuit 195, the sample and hold memory circuit 195 briefly buffer stores output values of the differential amplifier 194 until they are processed by the ensuing circuit. An analog/digital converter 197 is connected to the output of the sample and hold circuit 195 and converts the analog measurement values at the output of the sample and hold circuit 195 into digital output values $U_n$ for a microprocessor 200, which includes an internal programmable memory PROM, as well as an EEPROM 202 with the data of the sensor, and a RAM 203, in the usual manner.

The microprocessor 200 outputs an output signal $U_a$ at its output 205. $U_a = H$ (high output signal) means that the scanner 94, 95 or 185 is located at a label 17, and $U_a = L$ (low output signal) means that the scanner is located in a gap 20 between two labels 17.

A signal $U_m$ can be supplied to the microprocessor 200 from the outside, for instance via a switch (not shown), or from the controller 126. $U_m = H$ (high) means that a normal scanning process should take place, that is, that the sensor arrangement should ascertain whether the scanner is located at a label or in a gap between labels.

$U_m = L$ (low) means that a pre-measurement or calibration process should proceed, in other words, that a length of a label strip, for instance 30 cm long, is scanned continuously, and from the values $U_n$ thus ascertained, a reference thickness voltage $U_{ref}$ (for internal use by the microprocessor 200) is to be determined.

In the EEPROM 202, as already noted, the data of the sensor system are stored. Since because of tolerances in the manufacture of the components, two sensor systems will rarely be completely identical, one can for instance measure a sensor system in such a way that the signal $U_n$ for various distance values D (FIG. 5), or for the corresponding thickness values d (FIG. 5) of the label strip 13 are measured and stored as a values table in the EEPROM; for instance $d = 0.055$ mm is equivalent to $U_n = 2.4$ V, $d = 0.06$ mm is equivalent to $U = 2.65$ V, and so forth. Alternatively, these values can be replaced by a function that reflects their mathematical relationship, such as a linear relationship of the type $U_n = a \times d - b$.

This can either be done separately for each sensor, that is, its calibration curve may be stored in the EEPROM 202 for each individual case, or averaged values for this type of sensor may be stored. This depends on the overall requirement for system accuracy, as will readily be appreciated by those skilled in the art.

Experience with the invention on applicant's own shopfloor has shown that the embodiment of FIGS. 2 to 4 is very sensitive and ideally suited for high labelling speeds. However, shopfloor mechanics tend to use large tools like hammers, screwdrivers, etc., and the sensitive spring 80 and coil 87 of FIGS. 2 to 4 frequently are damaged by inept engineers.

The label sensor 200a of the third embodiment shown in FIGS. 15 to 18 is sturdier, but labelling speeds achievable with it tend to be lower since its mechanical response is somewhat more sluggish. Label sensor 200 of FIGS. 15 to 18 essentially uses the same component parts as the previous embodiments, but in a different configuration, and therefore, the same reference numerals are used where appropriate.

Figure 15:
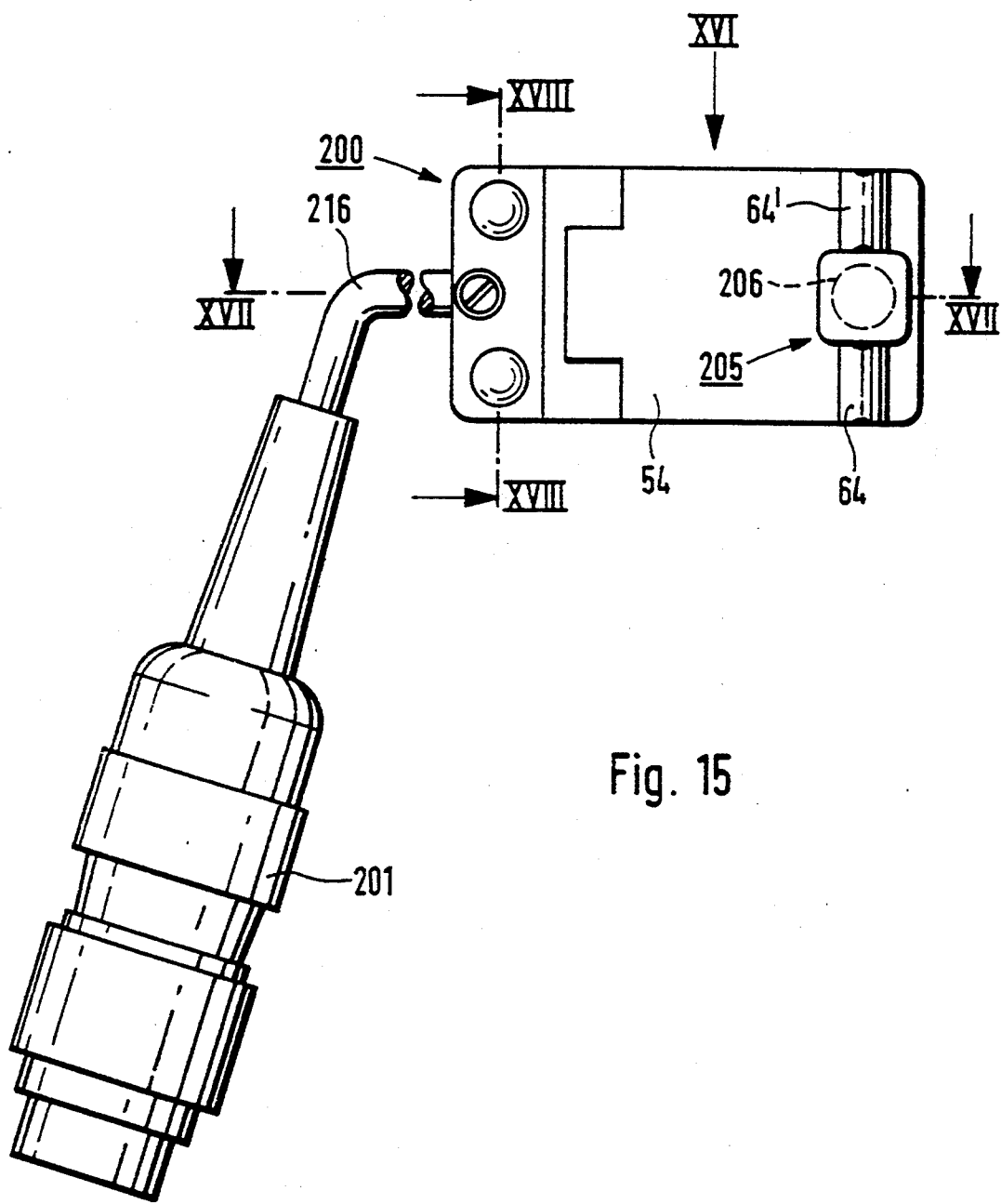
FIG. 15 shows the label sensor as seen from below, in the direction of arrow XV of FIG. 16.
Figure 16:
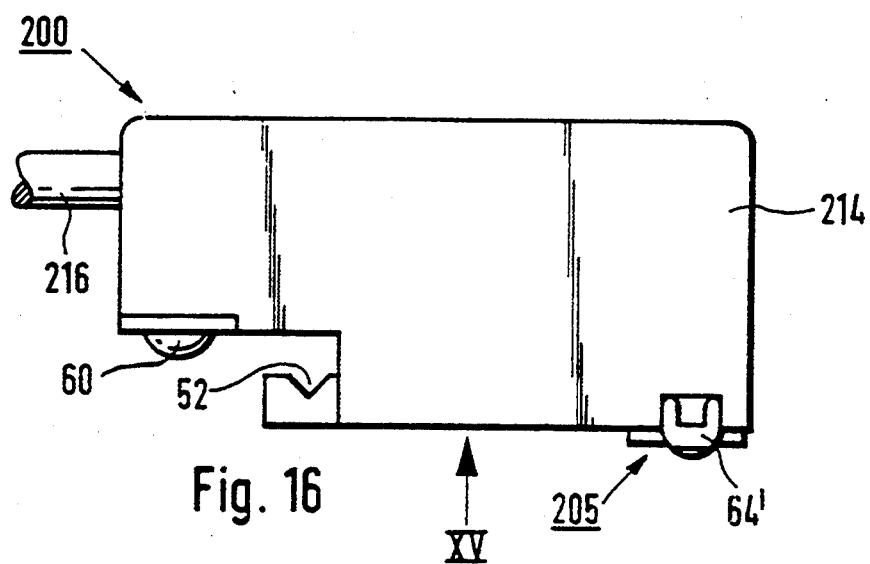
FIG. 16 shows the sensor from one side, in the direction of the arrow XVI of FIG. 15.
Figure 17:
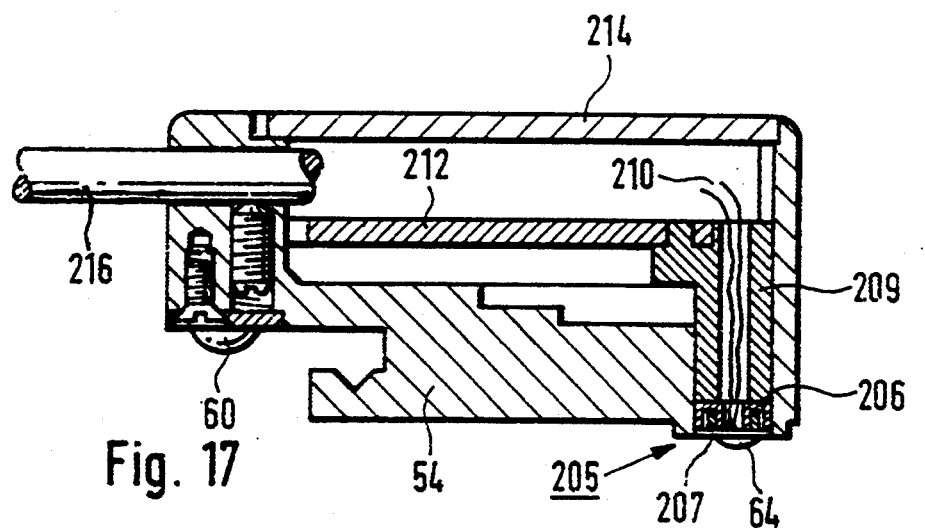
FIG. 17 shows a longitudinal section of the sensor, as seen along line XVII—XVII of FIG. 15.
Figure 18:
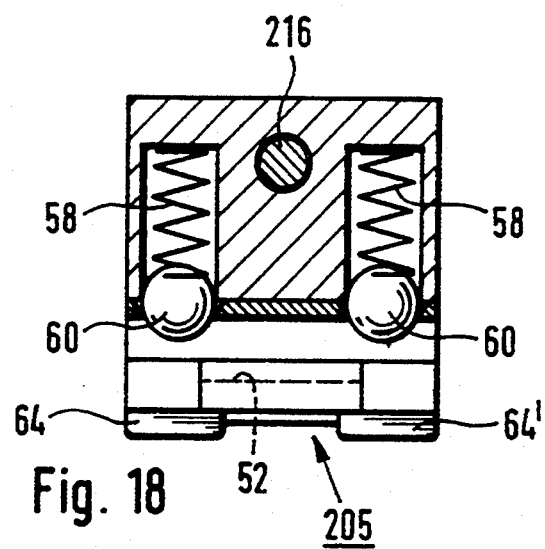
FIG. 18 shows a sectional view of the sensor, as seen along line XVIII—XVIII of FIG. 15.

FIG. 15 shows the label sensor 200 seen from below, in the direction of arrow XV of FIG. 16, and with an electric plug 201 attached. FIG. 16 shows the sensor 200 from one side, in the direction of arrow XVI of FIG. 15. FIG. 17 shows a longitudinal section, seen along line XVII—XVII of FIG. 15, and FIG. 18 shows a sectional view, seen along line XVIII—XVIII of FIG. 15. FIGS. 15 and 18 are drawn to an enlarged scale in order to facilitate understanding.

The mechanical attachment of label sensor 200 to the labelling machine is identical with that shown in FIGS.

1A, 2, 3 and 11A, i.e. the sensor 200 is provided with a prismatic recess 52 in its support part 54, and with two balls 60 that are loaded by biassed springs 88. The reader is referred to the description of FIG. 2 for details. The springs 58 and balls 60 produce a torque acting around the prismatic recess 52 in a clockwise direction and pressing the sensor 200a against the label strip (e.g. label strip 13 of FIGS. 7 and 8) so that it contacts same with its two downholders 64 and 64' and presses it against a supporting surface, e.g. part 34 in FIG. 1A. The downholders 64, 64' which are made of oxide ceramics or another hard material are practically identical with those shown in FIGS. 2 to 4, and as the label strip 13 moves, they follow its surface and move up and down accordingly. This was described above in detail, and the reader is referred thereto. The downholders 64, 64' can be exchanged easily when worn after longer use.

In the present embodiment, the downholders 64, 64' also act as mechanical sensors, referred to above as a "scanner", for a sensor coil arrangement 205. In contrast to the previous embodiments, this sensor coil arrangement 205 is fixedly arranged at the lower surface of support part 54, i.e. it moves with the support part 54 and has no supporting spring of its own. As already explained, the downholders 64, 64' also act as mechanical sensors or label strip followers for coil 205, and the springs 58 act as the spring coupled to sensor coil arrangement 205.

Coil 206 is identical in structure with coil 75 shown in FIG. 5, i.e. it comprises a ferromagnetic core 206 identical with shell core 87 of FIG. 5 and open towards the lower side, as in FIG. 5, plus a winding 207 identical with winding 85 of FIG. 5. Core 206 is arranged at the bottom end of a tubular insulating part 209 that serves as a duct for housing the connecting wires 210 of winding 207. The wires 210 are connected to a printed circuit (not shown) arranged on a printed circuit board 212 in the upper part of the housing 214 of sensor 200a. An electric cable 216 serves to connect the plug 201 to circuit board 212. The circuit on circuit board 212 is identical with that previously described with reference to FIGS. 6 or 14, and the reader is referred thereto for details.

Operation of FIGS. 15 to 18

The winding 207 is excited by a radio frequency signal of e.g. 1 MHz and outputs a corresponding R.F. electromagnetic field at the bottom side of core 206 This field produces eddy currents in an opposed electrically conductive element, e.g. in the metal peeler blade 34 shown in FIG. 1A. These eddy currents dampen the oscillations in the resonance circuit formed by coil 207 and capacitor 97 (FIGS., 6 or 14). The eddy currents become weaker when the downholders 64, 64'—which are practically aligned with coil 207—are positioned on top of a label 17, resulting in a higher voltage on coil 207. The eddy currents become stronger when the downholders 64, 64' are in a gap 20 (FIG. 7) between two adjacent labels 17, resulting in stronger damping or attenuation and thus a lower voltage on coil 207. In this way, it is possible to differentiate between "LABEL" or "NO LABEL", irrespective of the material of the label or of the carrier tape, in a very reliable way and without much adjustment work. Adjustment is made e.g. by manually setting the potentiometer 70 shown in FIGS. 6 or 14.

The great advantage of the third embodiment is that it is much sturdier with respect to shopfloor practice and therefore less apt to be damaged accidentally. The downholders 64, 64' protrude below the lower surface of sensor coil arrangement 205, creating a distance between it and the surface being sensed, as explained above in connection with FIG. 5 and distances D and d. The reader is referred thereto for more details.

Various changes and modifications may be made, and features described in connection with any one of the embodiments may be used with any of the others, within the scope of the inventive concept.

What is claimed is:

1. A label sensor operable (45; 145) for scanning a label strip (13), the label strip (13) being of the kind including a backing strip (14) provided with labels (17) removably adhered on a surface (15) of said backing strip (14), and for controlling a labeling process, the label sensor comprising:

an electrically conductive support surface arranged (34; 122) for supporting said label strip (13) for movement relative to said label sensor (45; 145);

a spring element (58; 80; 182);

a ferromagnetic core (87; 184; 206) provided with a winding (85; 207), said core being coupled to said spring element and being biased by said spring element toward said support surface (34; 122);

a surface following member (64; 94, 95; 185) coupled to said spring element (58; 80; 182) and being immovable relative to said ferromagnetic core, said spring element being adapted to bias said surface following member toward said support surface and toward the surface of said label strip (13) having the labels (17) thereon, such that said surface following member contacts said relatively moving label strip;

means for electrically exciting said winding (85; 207) with a high frequency signal to produce a magnetic field by said winding to produce a voltage output (85; 207); and evaluation circuit means (103) coupled to said winding (85; 207) for receiving said voltage output of said winding and for producing a signal indicating the presence or absence of a label at said label sensor.

2. The label sensor of claim 1, further comprising at least one holding-down device (64, 64'; 177, 178) provided at a region adjacent to said surface following member (94, 95; 185), for contacting and pressing down said label strip against said support surface.

3. The label sensor of claim 2, wherein said at least one holding-down device comprises a holding-down device on both opposite sides of said surface following member each extending in a direction substantially transversely of the movement direction of said label strip (13).

4. The label sensor of claim 2, further comprising a support member ( 54; 176 ), and wherein: each of said at least one holding-down device (64, 64'; 177, 178) is mounted on said support member (54; 176); and said spring element (80; 182), with said surface following member (94, 95; 185) coupled thereto being mounted on said support member (54; 176) such that said surface following member (94, 95; 185) is deflectable via said spring element relative to said at least one holding-down device (64, 64'; 177,178).

5. The label sensor of claim 4, wherein: each of
said at least one holding-down device has a contact face for contacting said label strip; and said surface following member (94, 95; 185), in a relaxed state of said spring element, protrudes beyond a plane (96) in which each of said contact faces of said at least one holding-down device (64, 64'; 177, 178) is located (FIG. 4; FIG. 12).

6. The label sensor of claim 4, wherein:
said spring element comprises a resiliently deflectable leaf spring element having a free end;
said ferromagnetic core (87; 184), provided with said winding (85), is located in a region of said free end of said resiliently deflectable leaf spring element; and
further comprising means for resiliently supporting said support member (54; 176) on a labeling machine.

7. The label sensor of claim 6, wherein said support member (54; 176) is mounted on a resiliently deflectable arm of the labeling machine.

8. The label sensor of claim 6, wherein:
said support member comprises spaced apart runner members mounting a pair of holding-down devices (177, 178) arranged to contact said movable label strip for pressing said label strip against said support surface; and
said ferromagnetic core and said surface following member are located between said runner members.

9. The label sensor of claim 1, wherein said ferromagnetic core (87; 184) provided with said winding (85) thereon is deflectable via said spring element substantially transversely of the direction of movement of said label strip (13).

10. The label sensor of claim 1, wherein said ferromagnetic core is an annulus comprising a shell core (87; 184; 206) open on one end including means for receiving said winding (85; 207), said open end of said shell core facing toward said label strip (13).

11. The label sensor of claim 10, wherein said shell core has an outer diameter of no greater than about 0.5 cm, and wherein said means for receiving said winding comprises a concentric channel in said open end of said shell core.

12. The label sensor of claim 1, wherein:
said spring element comprises a resiliently deflectable leaf spring element having a free end; and
said ferromagnetic core (87; 184), provided with said winding (85), is located in a region of said free end of said resiliently deflectable leaf spring element.

13. The label sensor of claim 12, wherein said leaf spring element comprises a spring steel sheet member (80; 182).

14. The label sensor of claim 12, wherein said leaf spring element (80; 182) extends substantially parallel to the path of movement of said label strip (13).

15. The label sensor of claim 14, wherein said free end of said leaf spring element (80; 182) points in the direction of movement of said label strip (13).

16. The label sensor of claim 16, wherein said surface following member (64; 94, 95; 185) is located in a region of said ferromagnetic core (87; 184; 207), and is arranged to create a minimum distance (D) between the ferromagnetic core (87; 184; 207) and said electrically conductive support surface (34; 122) which supports said label strip (13).

17. The label sensor of claim 16, wherein said ferromagnetic core (87; 184) has a longitudinal axis, and said surface following member (94, 95; 185) is located in a region of a longitudinal axis of said ferromagnetic core (87; 184).

18. The label sensor of claim 1, wherein said surface following member (94, 95; 185) is substantially pin-shaped.

19. The label sensor of claim 1, wherein said surface following member (94, 95; 185) is an elongated member.

20. The label sensor of claim 1, wherein said surface following member has an end face arranged to contact said label strip (13), said end face of said surface following member being formed of a low-wear material.

21. The label sensor of claim 20, wherein said low-wear material is a material selected from the group consisting of oxide ceramic, semiprecious stone, and precious stone.

22. The label sensor of claim 1, wherein said evaluation circuit means comprises:
an oscillator coupled to said winding (85; 107) for oscillating at a predetermined operating frequency;
means coupled to said oscillator for producing a control signal corresponding to the output of said oscillator;
reference voltage means for setting a reference voltage; and
comparator means fro comparing said control signal with said reference voltage for producing output signals distinguishing between the absence and presence of a label.

23. The label sensor of claim 22, wherein said evaluation circuit means (FIG. 6) further comprises means, including said comparator means, for discriminating between labels (17) and gaps (20) between labels (17).

24. The label sensor of claim 1, wherein said evaluation circuit means includes a reference thickness value setting means (70) for enabling discrimination between a label (17) and a gap (20) between labels.

25. The label sensor of claim 24, wherein said evaluation circuit means further comprises:
a microprocessor (200); and
a memory (202) coupled to said microprocessor and in which characteristic data of the label sensor (45; 145) are stored.

26. A labeling machine including the label sensor as defined in claim 1, further comprising:
means for pivotably connecting said label sensor to the labeling machine (10) via a pivot member (53), said pivot member defining an axis of rotation which extends at least substantially parallel to a plane of the label strip (13) at a scanning point.

27. The labeling machine of claim 26, further comprising an elastic member (58) for applying a torque in the direction of movement of the label strip (13) supported by said support member (54).

28. The labeling machine of claim 27, wherein said elastic member (58) comprises a spring (58).

29. The labeling machine of claim 28, wherein said spring (58) presses against a pressure applying ball member (60), which is mounted displaceably on said support member (54), said ball member, after assembly, resting with bias against a stationary part (46; 46') of the labeling machine (10).

30. The labeling machine of claim 29, wherein said pressure applying ball member (60) cooperates with a detent in said labeling machine for locking said support member (54) in a detent manner onto said labeling machine (10).

31. The label machine of claim 26, wherein means is provided for removably mounting said support member (54) on said labeling machine (10).

* * * * *

UNITED STATES PATENT AND TRADEMARK OFFICE
CERTIFICATE OF CORRECTION

PATENT NO. : 5,421,946
DATED : June 6, 1995
INVENTOR(S) : FLAIG, Oswald

It is certified that error appears in the above-indentified patent and that said Letters Patent is hereby corrected as shown below:

Title page, beneath Item [22], insert:

--[30] Foreign Application Priority Data
May 7, 1992 [DE] Germany ....UM G 92 06 076.5--.

Column 12, line 12 (claim 1), "A label sensor operable (45;145)"
should be --A label sensor (45;145) operable--;

lines 18 and 19 (claim 1), "arranged (34;122)"
should be --(34;122) arranged--;

line 37, (claim 1), after "winding" insert --(85;207)--;

line 38, delete "(85;207)";

line 56 (claim 4), after "wherein;" delete "each of".

Column 13, line 57 (claim 16, line 1), "claim 16" should be
--claim 1--.

Signed and Sealed this

Second Day of September, 1997

*Attest:*

BRUCE LEHMAN

*Attesting Officer*  *Commissioner of Patents and Trademarks*